United States Patent
Autran et al.

(10) Patent No.: US 6,825,285 B2
(45) Date of Patent: Nov. 30, 2004

(54) BIODEGRADABLE POLYHYDROXYALKANOATE COPOLYMERS HAVING IMPROVED CRYSTALLIZATION PROPERTIES

(75) Inventors: Jean-Philippe Marie Autran, Wyoming, OH (US); David Harry Melik, Cincinnati, OH (US); Michael Matthew Satkowski, Oxford, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/600,501

(22) Filed: Jun. 20, 2003

(65) Prior Publication Data

US 2003/0236358 A1 Dec. 25, 2003

Related U.S. Application Data

(63) Continuation of application No. PCT/US01/50462, filed on Dec. 20, 2001.
(60) Provisional application No. 60/257,911, filed on Dec. 21, 2000.

(51) Int. Cl.[7] ............................................... C08L 67/04
(52) U.S. Cl. ....................... 525/418; 525/450; 528/354; 528/361
(58) Field of Search ................................. 525/418, 450; 528/354, 361

(56) References Cited

U.S. PATENT DOCUMENTS

| | | |
|---|---|---|
| 4,393,167 A | 7/1983 | Holmes et al. |
| 4,537,738 A | 8/1985 | Holmes |
| 4,876,331 A | 10/1989 | Doi |
| 4,880,592 A | 11/1989 | Martini et al. |
| 5,061,743 A | 10/1991 | Herring et al. |
| 5,138,029 A | 8/1992 | Nishioka et al. |
| 5,231,148 A | 7/1993 | Kleinke et al. |
| 5,281,649 A | 1/1994 | Organ et al. |
| 5,292,860 A | 3/1994 | Shiotani et al. |
| 5,498,692 A | 3/1996 | Noda |
| 5,516,565 A | 5/1996 | Matsumoto |
| 5,536,564 A | 7/1996 | Noda |
| 5,550,173 A | 8/1996 | Hammond et al. |
| 5,578,382 A | 11/1996 | Waddington |
| 5,602,227 A | 2/1997 | Noda |
| 5,624,249 A | 4/1997 | Rohlfing |
| 5,685,756 A | 11/1997 | Noda |
| 5,693,389 A | 12/1997 | Liggat |
| 2003/0181555 A1 * | 9/2003 | Figuly ........................ 524/284 |

FOREIGN PATENT DOCUMENTS

| | | |
|---|---|---|
| GB | 1139528 | 1/1969 |
| WO | WO 94/17121 | 8/1994 |
| WO | WO 94/27048 | 11/1994 |
| WO | WO 94/28047 | 12/1994 |
| WO | WO 96/09402 | 3/1996 |
| WO | WO 02/28969 A | 4/2002 |

OTHER PUBLICATIONS

Organ, B., Phase separation in a blend of poly(hydroxybutyrate) with poly (hydroxybutyrate–co–valerate), Polymer, vol. 34, No. 3, 1993, pp. 459–467.

(List continued on next page.)

Primary Examiner—Margaret G. Moore
Assistant Examiner—Marc S Zimmer
(74) Attorney, Agent, or Firm—Armina E. Matthews; Kim William Zarby; Steven W. Miller

(57) ABSTRACT

Compositions having improved crystallization properties and physical properties including a continuous phase of a first biodegradable polyhydroxyalkanoate comprising a copolymer, or a blend thereof, of at least two randomly repeating monomer units and having a melting point Tm1, and a second crystallizable biodegradable polyhydroxyalkanoate homopolymer or copolymer, which comprises at least one randomly repeating monomer unit and has a melting point Tm2, where Tm2 is at least about 20☐C. greater than Tm1. The compositions are formed by solution or melt blending of the components and may be formed into shaped articles.

20 Claims, 1 Drawing Sheet

OTHER PUBLICATIONS

Wthey, H., *The effect of seeding on the crystallization of poly(hydroxybutyrate) and co–poly(hydroxybutyrate–co–valerate)*, Polymer, vol. 40, 1999, pp. 5147–5152.

Mater, J., *Nucleation behavior of* polv–3–hydroxybutyrate., Sci. 19, p. 3826, (1984).

Mater, J., Sci. 27, p. 3239 (1992).

Hobbs, et al., *The effect of water on the crystallization of thin films of poly(hydroxybutyrate)*, Polymer (1997) 38, #15, pp. 3879–3883.

Marchessault et al., *Biorefinery polymers in search of applications*, Makromol. Chem., Makromol. Symp. 19, p. 235–254 (1988).

Horowitz et al., *Phase separation within artificial granules from a blend of polyhydroxytbutyrate and polyhydroxyocatanoate: biological implications*, Polymer (1994) 35, , #23, pp. 5079–5083.

deKoning et al., *Crystallization phenomena in bacterial poly[(R)–3–hydroxybutyrate]: 2. Embrittlement and rejuvenation*, Polymer (1993) 34, #19, pp. 4089–4094.

deKoning et al., *Crystallization phenomena in bacterial poly[(R)–3–hydroxybutyrate]: 3. Toughening via texture changes*, Polymer (1994) 35, #21 pp. 4598–4605.

Biddlestone et al., *The Physical Ageing of Amorphous Poly(hydroxybutyrate)*, Polymer International 39, (1996) pp. 221–229.

Mater, J., *Nucleation behavior of* polv–3–hydroxybutyrate., Sci. 19, p. 3826, (1984).

* cited by examiner

BIODEGRADABLE POLYHYDROXYALKANOATE COPOLYMERS HAVING IMPROVED CRYSTALLIZATION PROPERTIES

CROSS-REFERENCE

This application is a continuation of International Application PCT/US01/50462, with an international filing date of Dec. 20, 2001, which claims benefit of Provisional Application Ser. No. 60/257,911, filed Dec. 21, 2000.

FIELD OF THE INVENTION

The present invention is directed to biodegradable semicrystalline polyhydroxyalkanoate copolymers and blends containing such copolymers having improved crystallization properties, to methods for improving the crystallization rates and physical properties of such semicrystalline copolymers, to methods of forming shaped articles from such copolymers, and to shaped articles formed by such methods.

Shaped articles formed with such copolymers include, but are not limited to, films, fibers, nonwovens, sheets, membranes, coatings, binders, foams and molded products for packaging. The products exhibit a desirable combination of high crystallization rate, ductility and flexibility, and importantly biodegradability. Additional benefits of such blends are described in the invention. The products are useful for a variety of biodegradable articles, such as diaper topsheets, diaper backsheets, disposable wipes, shopping and lawn/leaf bags, agricultural films, yard waste nets, fishing nets, seeding templates, flower pots, disposable garments, medical disposables, paper coatings, biodegradable packaging, binders for cellulose fibers or synthetics, and the like.

BACKGROUND OF THE INVENTION

This invention relates to the need for alleviating the growing environmental problem of excessive plastic waste that makes up an ever more important volume fraction of what get thrown out in landfills every year. Biodegradable polymers and products formed from biodegradable polymers are becoming increasingly important in view of the desire to reduce the volume of solid waste materials generated by consumers each year. The invention further relates to the need for developing new plastic materials that can be used in applications where biodegradability, compostability or biocompatibility, are among primary desirable features of such applications. Such examples include for instance agricultural films, and the convenience that such films offer to farmers when they do not have to be collected after they have served their purpose. Flower pots or seeding templates are other examples where the temporary nature of the substrate translates into convenience for the user. Similarly, means of disposal of sanitary garments, such as facial wipes, sanitary napkins, pantiliners, or even diapers, may also be advantageously broadened with the use of materials that degrade in the sewage. Such items could be easily disposed directly in the sewage, after use, without disrupting current infrastructure (septic tanks or public sewage), and giving the consumer more disposal options. Current plastics typically used in making such sanitary garments can not be disposed without undesirable material accumulation. New materials to be used in the examples above would ideally need to exhibit many of the physical characteristics of conventional polyolefins; they must be water impermeable, tough, strong, yet soft, flexible, rattle-free, possibly low-cost and must be capable of being produced on standard polymer processing equipment in order to be affordable.

Another application which illustrates the direct benefit of compostable thermoplastic materials are leaf/lawn bags. Today's sole compostable bag which does not require the composter the additional burden of bag removal and the risk of compost contamination is the paper bag. Yet, it fails to provide the flexibility, the toughness and moisture-resistance of plastic films, and is more voluminous to store. Compostable plastic films used to make leaf/lawn bags would provide bags that could be disposed much like paper bags, yet provide the convenience of plastic bags.

It becomes clear in view of these examples that a combination of biodegradability, melt-processability and end-use performance is of particular interest to the development of a new class of polymers. Melt processability is key in allowing the material to be converted in films, coatings, nonwovens or molded objects by conventional processing methods. These methods include cast film and blown film extrusion of single layer structures, cast or blown film co-extrusion of multi-layer-structures. Other suitable film processing methods include extrusion coating of one material on one or both sides of a compostable substrate such as another film, a non-woven fabric or a paper web. Other processing methods include traditional means of making fibers or nonwovens (melt blown, spun bounded, flash spinning), and injection or blow molding of bottles or pots. Polymer properties are essential not only in ensuring optimal product performance (flexibility, strength, ductility, toughness, thermal softening point and moisture resistance) during end-use, but also in the actual product-making stages to ensure continuous operations. Rapid crystallization of the processed polymer melt upon cooling is clearly an essential feature necessary for the success of many converting operations, not only for economical reasons but also for the purpose of building in adequate structural integrity in the processed web (fiber, film) during converting, where for example crystallization times are typically less than about 3 seconds on commercial film and fiber lines.

In the past, the biodegradable and physical properties of a variety of PHA's have been studied, and reported. Polyhydroxyalkanoates are generally semicrystalline, thermoplastic polyester compounds that can either be produced by synthetic methods or by a variety of microorganisms, such as bacteria and algae. The latter typically produce optically pure materials. Traditionally known bacterial PHA's include isotactic Poly(3-hydroxybutyrate), or i-PHB, the high-melting, highly crystalline, very fragile/brittle, homopolymer of hydroxybutyric acid, and Poly(3-hydroxybutyrate-co-valerate), or i-PHBV, the somewhat lower crystallinity and lower melting copolymer that nonetheless suffers the same drawbacks of high crystallinity and fragility/brittleness. PHBV copolymers are described in the Holmes et al U.S. Pat. Nos. 4,393,167 and 4,880,59, and until recently were commercially available from Imperial Chemical Industries under the trade name BIOPOL. Their ability to biodegrade readily in the presence of microorganisms has been demonstrated in numerous instances. These two types of PHA's however are known to be fragile polymers which tend to exhibit brittle fracture and/or tear easily under mechanical constraint. Their processability is also quite problematic, since their high melting point requires processing temperatures that contribute to their extensive thermal degradation while in the melt. Finally, their rate of crystallization is noticeably slower than traditional commercial polymers, making their processing either impossible or cost-prohibitive on existing converting equipment.

Other known PHA's are the so-called long side-chain PHA's, or isotactic PHO's (poly(hydroxyoctanoates)).

These, unlike i-PHB or PHBV, are virtually amorphous owing to the recurring pentyl and higher alkyl side-chains that are regularly spaced along the backbone. When present, their crystalline fraction however has a very low melting point as well as an extremely slow crystallization rate, two major drawbacks that seriously limit their potential as useful thermoplastics for the type of applications mentioned in the field of the invention.

Recently, new poly(3-hydroxyalkanoate) copolymer compositions have been disclosed by Kaneka (U.S. Pat. No. 5,292,860), Showa Denko (EP 440165A2, EP 466050A1), Mitsubishi (U.S. Pat. No. 4,876,331) and Procter & Gamble (U.S. Pat. Nos. 5,498,692; 5,536,564; 5,602,227; 5,685,756). All describe various approaches of tailoring the crystallinity and melting point of PHA's to any desirable lower value than in the high-crystallinity i-PHB or PHBV by randomly incorporating controlled amounts of "defects" along the backbone that partially impede the crystallization process. Such "defects" are either, or a combination of, branches of different types (3-hydroxyhexanoate and higher) and shorter (3HP, 3-hydroxypropionate) or longer (4HB, 4-hydroxybutyrate) linear aliphatic flexible spacers. The results are semicrystalline copolymer structures that can be tailored to melt in the typical use range between 80° C. and 150° C. and that are less susceptible to thermal degradation during processing. In addition, the biodegradation rate of these new copolymers is typically accrued as a result of their lower crystallinity and the greater susceptibility to microorganisms. Yet, whereas the mechanical properties and melt handling conditions of such copolymers are generally improved over that of i-PHB or PHBV, their rate of crystallization is characteristically slow, often slower than i-PHB and PHBV, as a result of the random incorporation of non-crystallizable defects along the chains. Thus, it remains a considerable challenge to convert these copolymers into various forms by conventional melt methods, for they lack sufficient structural integrity or they remain substantially tacky, or both, after they are cooled down from the melt, and remain as such until sufficient crystallization sets in. Residual tack typically leads to material sticking to itself or to processing equipment, or both, and thereby can restrict the speed at which a polymeric product is produced or prevent the product from being collected in a form of suitable quality. Hence, significant improvements in the rate of crystallization are needed if these more desirable copolymers are to be converted into films, sheets, fibers, foams, molded articles, nonwoven fabrics and the like, under cost-effective conditions. The issue of the slow crystallization rate of PHBV is a well-recognized one and has been addressed previously either in the open literature or in patent applications which disclose a variety of options that can help enhance its crystallization rate.

For example, Herring et al.'s U.S. Pat. No. 5,061,743 discloses the use of a combination of an organophosphonic acid or ester compound and a metal oxide, hydroxide or carboxylate salt as nucleating agents to improve the crystallization rates of PHA's such as PHB. It builds upon an earlier British composition patent by Binsbergen for crystalline linear polyesters (GB 1,139,528). Similarly, Organ et al. in U.S. Pat. No. 5,281,649 discloses the use of ammonium chloride as a nucleating agent to improve the crystallization rates of PHAs, for example PHB. The small size of the nucleant minimizes problems of opacity and agglomeration otherwise experienced with particulates. Additional examples of additives blended with PHA's that improve their crystallization rate can be found. For example, U.S. Pat. No. 5,516,565, to Matsumoto, proposes the use of crystallization agents such as aromatic aminoacids, e.g. tyrosine and phenyl alanine, that are capable of being decomposed or metabolized in an animal or in the environment, hence allowing the use of nucleated PHA in medical devices. In 1984, P. J. Barham wrote a review of the different types of nucleants in an article entitled "Nucleation behavior of poly-3-hydroxybutyrate" (J. Mater. Sci., 19, p. 3826 (1984)). He notes that the nucleating effect of impurities such as talc comes from their ability to reduce the entropy of partially adsorbed molecules, whereas additives such as saccharin work by epitaxial, crystallographic matching. He also described self-seeding, a phenomenon that produces an increase in the nucleation density of semicrystalline polymers, with however very limited practical implications since the polymer must be kept within only a few degrees of the peak melting point of the polymer. In a different article, Organ et al. also elucidate the epitaxial growth of PHB off ammonium chloride crystals and demonstrated positive results with boron nitride, saccharin and the hydrogen-peroxide salt of urea as nucleating agents (J. Mater. Sci., 27, p. 3239 (1992)). Finally, Hobbs et al. report about the beneficial effect of water on the crystal growth rate of thin films of poly(hydroxybutyrate) in a published article (Polymer, 38, p. 3879 (1997)).

Blends containing PHA's are also disclosed with potential benefits on their crystallization rate, and several scientific studies have been aimed at characterizing such blends. For instance, a Japanese patent assigned to Mitsubishi Rayon (JP Patent No. 63172762) reports on the use of i-PHB as an additive to PET in order to improve its crystallization rate. Kleinke et al., in U.S. Pat. No. 5,231,148, teach about a mixture containing polyhydroxyalkanoate and compounds with reactive acid and alcohol groups which possesses better mechanical properties and crystallizes at a higher temperature than the pure PHA. Hammond discloses polymer compositions containing a PHA polymer and an oligomer selected from the group: PHA's, polylactide, polycaprolactone and copolymers thereof (U.S. Pat. No. 5,550,173). In World Patent Application No. 96/09402, Cox et al. describe a hydroxycarboxylic acid copolyester comprising non-random blocks of different compositions, the higher melting component contributing to reduce the crystallization time of the overall material. In their scientific article published in Polymer, 34, p. 459 (1993)), Organ et al. examine the phase behavior and the crystallization kinetics of melt blends of i-PHB with PHBV (w/18.4% valerate) over their entire composition range, in 10% composition change increments. Their data indicate separate melt and two crystal phases in the case of blends that contain a majority of the PHBV copolymer. The authors however fail to recognize and establish positive consequences that such blend structures may have on their crystallization rate. In a scientific study published in Makrom. Chem., Makrom. Symp., 19, p. 235 (1988), Marchessault et al. describe the process of solution-blending i-PHB with PHBV in chloroform, followed by their co-precipitation in diethyl ether. Horowitz et al. describe an in-vitro procedure for preparing artificial granules made of i-PHB with PHO (using ultrasonic centrifugation) which produces a single, uniform population of granules that retain their amorphous elastomeric state (Polymer, 35, p. 5079 (1994)).

More immediately relevant to the present invention, Liggat in U.S. Pat. No. 5,693,389 discloses dry blending a higher melting PHA such as PHB in powder form to serve as a nucleating agent for a lower melting PHA such as PHBV. Although the idea has a positive impact on the crystallization rate, the crystallization rate benefit is limited by the relatively large size and the low dispersibility of the PHB powder. In addition, the size of the dispersed PHB powder generally impedes processing of such blends into thin products like films, coatings or fibers (due to die clogging), and can also be responsible for their low aesthetics and weakened mechanical properties (e.g., stress concentration loci in the final articles, opacity, etc.). Moreover, the close vicinity of the i-PHB and PHBV melting points is responsible for the limited size of the processing temperature window where the nucleating i-PHB particles remain active. Very recently, Withey and Hay reinvestigated seeding phenonema and their influence on the crystallization rate in blends of i-PHB and PHBV (Polymer, 40, p. 5147 (1999)). Their approach however failed to generate better results for the use of i-PHB as a nucleating agent over boron nitride.

Hence, all prior reported attempts to improve the crystallization rates of PHA polymers and copolymers have been unsatisfactory in that the crystallization rate remains too low for commercial processing, and the nucleating agent can disadvantageously affect one or more properties of the polymer or copolymer, for example rendering them opaque or introducing loci of stress concentration, hence compromising the physical and mechanical or biodegradable properties of the polymers.

In addition to the above methods of chemical modification or blending of PHA's, there are also prior accounts of thermal treatment and special handling of PHA's that are said to contribute to increasing their crystallization rate as well as improving their physical properties. For instance, in U.S. Pat. No. 4,537,738, Holmes describes a process of preforming a partially crystallized PHB extruded form before subjecting it to a drawing stage and allowing completion of the crystallization in the stretched state. Waddington, in U.S. Pat. No. 5,578,382 proposes to achieve a high density of nucleation sites by cooling down a PHA film just above Tg (4–20° C.), before bringing the temperature back up towards the optimum temperature for crystal growth, for the purpose of achieving more rapid crystallization, smaller spherulites and improved barrier properties. De Koning et al. (Polymer, 34, p. 4089 (1993) & Polymer, 35, p .4599 (1994)) as well as Biddlestone et al. (Polym. Int., 39, p. 221 (1996)) studied the phenomena of physical aging and embrittlement in i-PHB or PHBV and attributed it to the occurrence of secondary crystallization with time. The phenomenon may be partially prevented or reversed by thermal annealing, by virtue of a change in morphology and a reduction of the overall amorphous-crystalline interface. De Koning (WO 94/17121) and Liggat et al. (WO 94/28047 and WO 94/28049) suggest the use of a post-conversion heating treatment to at least partially restore the mechanical properties of i-PHB or PHBV that are affected by physical aging and which is responsible for the embrittlement of the material over time. The same approach is proposed by Liggat et al (WO 94/28048) for these materials in the presence of a plasticizer.

Most of these process conditions applied to i-PHB or PHBV however fail to impart satisfactory physical and mechanical properties to the materials which generally tend to remain fragile. Accordingly, it would be advantageous to obtain PHA's which not only have improved crystallization rates, but also exhibit an advantageous combination of physical/mechanical properties allowing formation and use of shaped articles that are useful in a wide range of applications.

OBJECTS OF THE INVENTION

Accordingly, it is an object of the present invention to provide semicrystalline polyhydroxyalkanoate-containing compositions and methods for preparing such compositions which overcome disadvantages or limitations of the prior art. It is a related object of the present invention to provide semicrystalline polyhydroxyalkanoate compositions comprising biodegradable copolymers having improved crystallization rates and process methods that provide shaped articles made out of such compositions. It is a further object of the invention to provide methods for improving the crystallization rates of semicrystalline polyhydroxyalkanoates so that their conversion into shaped articles is either enabled or improved using conventional converting processes such as melt or solvent spinning, flash spinning, melt blowing, cast film extrusion or blown film extrusion, extrusion blow molding, injection molding or solvent coating. It is a further object of the invention to provide a biodegradable method for boosting the nucleation density, and as a result the overall crystallization rate, of biodegradable polyhydroxyalkanoates.

It is an additional object of this invention to provide tough, strong, yet flexible biodegradable sanitary and medical garments, compostable plastic bags and agricultural films, injection-molded pots, yard-waste nets, compostable foamed articles, biodegradable pulp, paper coatings, binders and the like, made out of the compositions of the present invention.

It is yet a further object of the invention to provide methods for forming shaped products that comprise semicrystalline polyhydroxyalkanoates with improved physical and mechanical properties. It is a further object of this invention to minimize physical aging and embrittlement of semicrystalline polyhydroxyalkanoates with time.

SUMMARY OF THE INVENTION

These and additional objects and advantages are provided by the compositions, methods and shaped articles of the present invention. In one embodiment, the invention is directed to compositions comprising at least two polymer components:

(a) wherein the first component, which makes up the bulk of the composition, is a crystallizable biodegradable polyhydroxyalkanoate copolymer, or a blend thereof, comprising at least two randomly repeating monomer units (RRMU's), wherein the first randomly repeating monomer unit, which comprises at least 50% of the total polyhydroxyalkanoate monomer units, has the structure (I):

wherein $R^1$ is H, or C1 or C2 alkyl, and n is 1 or 2; and the second randomly repeating monomer unit included in the polyhydroxyalkanoate copolymer is different from the first randomly repeating monomer unit and comprises at least one monomer selected from the group consisting of the structures (II) and (III):

wherein $R^2$ is a C3–C19 alkyl or C3–C19 alkenyl, and

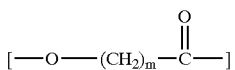 (III)

wherein m is from 2 to about 16, wherein the polyhydroxyalkanoate copolymer has a number average molecular weight of greater than about 100,000 g/mole, and further wherein the first biodegradable polyhydroxyalkanoate has a melting point Tm1, and:

(b) a second crystallizable biodegradable polyhydroxyalkanoate homopolymer or copolymer, or a blend thereof, which is finely dispersed within the bulk of the first biodegradable polyhydroxyalkanoate copolymer and which comprises at least one randomly repeating monomer unit having the structure (IV):

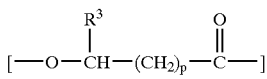 (IV)

wherein $R^3$ is H, or C1 or C2 alkyl, and p is 1 or 2; Optionally, the second biodegradable polyhydroxyalkanoate polymer can further comprise two or more additional randomly repeating monomer units selected from the group consisting of the structures (V) and (VI):

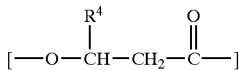 (V)

wherein $R^4$ is a C2–C19 alkyl or C2–C19 alkenyl, and

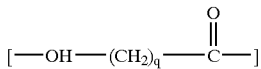 (VI)

wherein q is from 2 to about 16, wherein the additional randomly repeating monomer units represent up to 25% of the total monomer units, wherein the second biodegradable polyhydroxyalkanoate polymer suitably has a number average molecular weight of greater than about 50,000 g/mole, and further wherein the second biodegradable polyhydroxyalkanoate has a melting point Tm2. The second PHA melting point Tm2 is at least about 20° C. greater than the Tm1 of the first PHA, i.e., Tm2≧(Tm1+ 20° C.).

The intimate dispersion of the second biodegradable polyhydroxyalkanoate polymer (b) within the bulk of the first polyhydroxyalkanoate copolymer (a) is achieved by blending these two components in solution or in the melt, while in the presence of potential additional constituents. This not only results in a blend structural composition with a higher crystallization rate, but also allows such a composition to be processed on standard fiber and film converting equipment In another embodiment, the invention is directed to a method for enhancing the rate of crystallization of a first biodegradable polyhydroxyalkanoate copolymer, or a blend thereof, comprising at least two randomly repeating monomer units, wherein the first randomly repeating monomer unit has the structure (I):

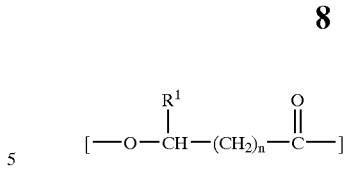 (I)

wherein $R^1$ is H, or C1 or C2 alkyl, and n is 1 or 2; and the second randomly repeating monomer unit is different from the first randomly repeating monomer unit and comprises at least one monomer selected from the group consisting of the structures (II) and (III):

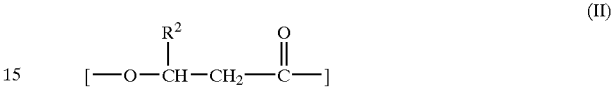 (II)

wherein $R^2$ is a C3–C19 alkyl or C3–C19 alkenyl, and

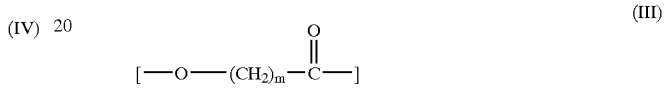 (III)

wherein m is from 2 to about 16, and wherein at least about 50 mole % of the copolymer comprises randomly repeating monomer units having the structure of the first randomly repeating monomer unit (I), and further wherein the copolymer has a melting point Tm1. The method comprises a step of dispersing in the first biodegradable polyhydroxyalkanoate component, at the molecular level, a second biodegradable polyhydroxyalkanoate homo- or copolymer, or blend thereof, comprising at least one randomly repeating monomer unit having the structure (IV):

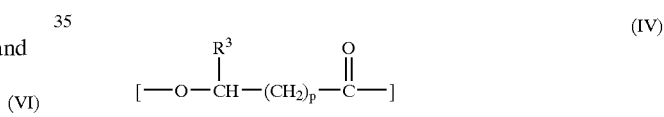 (IV)

wherein $R^3$ is H, or C1 or C2 alkyl, and p is 1 or 2. Optionally, the second biodegradable polymer further comprises two or more randomly repeating monomer units selected from the group consisting of the structures (V) and (VI):

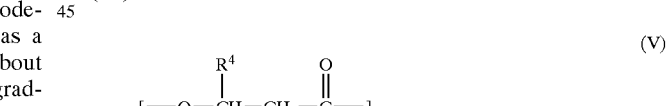 (V)

wherein $R^4$ is a C2–C19 alkyl or C2–C19 alkenyl, and

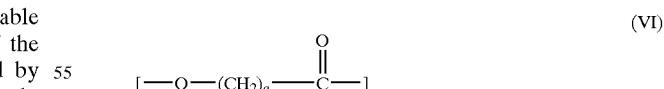 (VI)

wherein q is from 2 to about 16, wherein the additional randomly repeating monomer units represent up to 25% of the total monomer units, wherein the second biodegradable polyhydroxyalkanoate polymer suitably has a number average molecular weight of greater than about 50,000 g/mole, and further wherein the second biodegradable polyhydroxyalkanoate has a melting point Tm2. The second PHA melting point Tm2 is at least about 20° C. greater than that the Tm1 of the first PHA, i.e., Tm2≧(Tm1+20° C.). The fine dispersion is achieved by blending the two components in the melt, e.g. in a heated extruder, at a temperature above their respective melting points, or in solution, in a common solvent.

In yet further embodiments, the invention is directed to methods for successfully and efficiently converting the compositions of the present invention into shaped articles, such as films, fibers, nonwovens, coatings, injection moldings, blow moldings and the like, using standard processing equipment known to the field of polymer processing. The methods encompass processing the compositions at a temperature selected in the interval between Tm1 and Tm2, which spans a temperature range of more than 20° C. by virtue of the above relationship between Tm1 and Tm2 stated above. Also, the methods encompass forming and crystallizing the shaped articles at an elevated temperature selected within 25° C. within the optimal crystallization temperature, i.e. in the range between about 30° C. and 90° C., where crystal growth rate is maximized while taking advantage of the extremely high nucleation density that is provided by the compositions of the present invention. The resultant semicrystalline structure exhibits improved resistance to physical aging and embrittlement that otherwise negatively affects the mechanical properties with time. It eliminates the need of annealing the product and therefore simplifies the overall process of making shaped articles. The invention also includes a variety of useful shaped articles and final products formed by such processing methods using polyhydroxyalkanoate compositions of the present invention. This include tough, strong and flexible biodegradable sanitary and medical garments, compostable plastic bags and agricultural films, injection-molded pots, yard-waste nets, compostable foamed articles, biodegradable pulp, paper coatings, binders and the like.

The compositions and the methods of the invention provide the polyhydroxyalkanoate copolymer compositions with unsurpassed crystallization rates and therefore facilitate the use of polyhydroxyalkanoate copolymers in the production of articles therefrom. In a final embodiment, the polyhydroxyalkanoate compositions may be blended with compatible polymers other than PHA's and improve the processability, crystallization rate and final physical/mechanical properties. The other blend components must be selected among biodegradable polymers in the blend compositions are to remain biodegradable.

These and additional objects and advantages of the present invention will be more fully understood in view of the following detailed description.

BRIEF DESCRIPTION OF THE DRAWINGS

The following detailed description and examples will be more fully understood in view of the drawing in which.

DETAILED DESCRIPTION OF THE INVENTION

Figure 1:
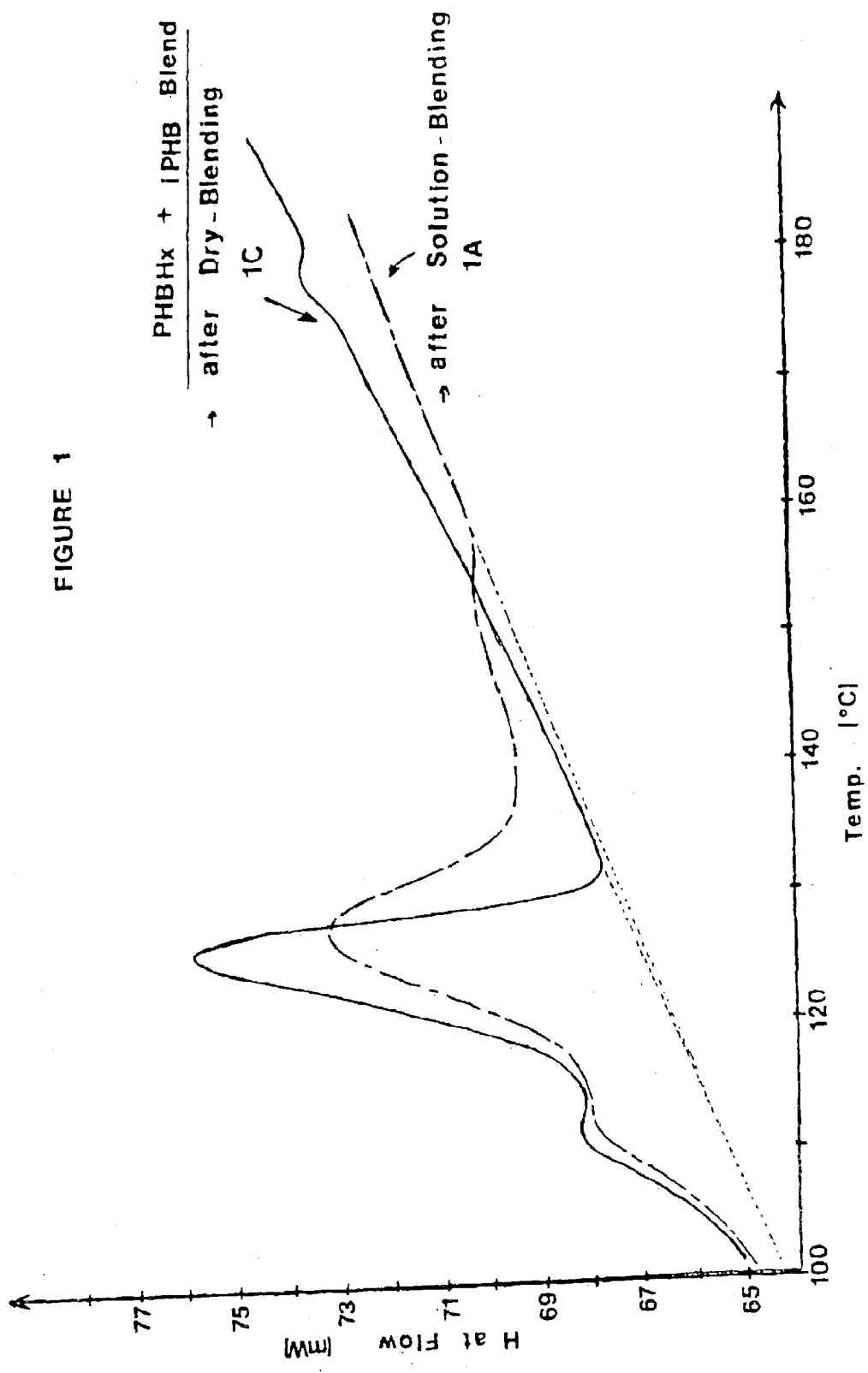
FIG. 1 sets forth a heat flow curve as a function of temperature for various compositions as described in Example 1.

The compositions according to the invention comprise at least first and second biodegradable polyhydroxyalkanoate components. The first biodegradable polyhydroxyalkanoate comprises a copolymer, or a blend thereof, comprising at least two RRMUs. The first RRMU has the structure (I):

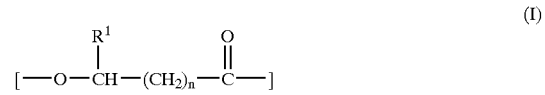

wherein $R^1$ is H, or C1 or C2 alkyl, and n is 1 or 2. In a preferred embodiment, $R^1$ is a methyl group ($CH_3$), whereby the first RRMU has the structure:

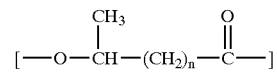

wherein n is 1 or 2. In a further preferred embodiment of the first RRMU, $R^1$ is methyl and n is 1, whereby the polyhydroxyalkanoate copolymer comprises 3-hydroxybutyrate units.

The second RRMU included in the first biodegradable polyhydroxyalkanoate copolymer comprises at least one monomer selected from the group consisting of the structures (II) and (III):

wherein $R^2$ is a C3–C19 alkyl or C3–C19 alkenyl, and

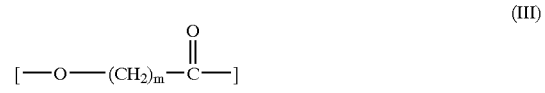

wherein m is from 2 to about 16. Generally, in the RRMU of formula (II), the length of $R^2$ will, to some extent, influence the reduction in overall crystallinity of the copolymer.

In a preferred embodiment, $R^2$ is a C3–C10 alkyl group or alkenyl group. In a further preferred embodiment, $R^2$ is a C3–C6 alkyl group, and in a further preferred embodiment, $R^2$ is a C3 alkyl group. In alternately preferred embodiments, $R^2$ is a C10–C19 alkyl or alkenyl group. With reference to the second RRMU comprising a monomer of structure (III), in a preferred embodiment, m is from 2 to about 10, and more preferably is from about 4 to about 8. In a further preferred embodiment, m is about 5. In further embodiments, the biodegradable polyhydroxyalkanoate copolymer comprises the first RRMU of structure (I) and second RRMUs of both structure (II) and structure (III).

In order to obtain an advantageous combination of physical properties and biodegradability of the polyhydroxyalkanoate copolymer, at least about 50 mole % of the copolymer comprises RRMUs having the structure of the first RRMU of formula (I). Suitably, the molar ratio of the first RRMUs to the second RRMUs in the copolymer is in the range of from about 50:50 to about 99:1. More preferably, the molar ratio is in the range of from about 75:25 to about 95:5, and even more preferred is in the range of from about 80:20 to about 95:5. In yet further preferred embodiments, the molar ratio of the first RRMUs to the second RRMUs is in the range of from about 85:15 to about 95:5. In addition, the polyhydroxyalkanoate copolymer suitably has a number average molecular weight of greater than about 100,000 g/mole, and further wherein the first biodegradable polyhydroxyalkanoate has a melting point Tm1. While not intending to be bound by theory, it is believed that the combination of the second RRMU chain and/or branch lengths and the indicated molar amounts sufficiently decrease the crystallinity of the first RRMU to form the copolymer with desired physical properties.

In further embodiments of the polyhydroxyalkanoate copolymer employed in the compositions, one or more additional RRMUs may be included. Suitably, the additional RRMUs may have the structure (VII):

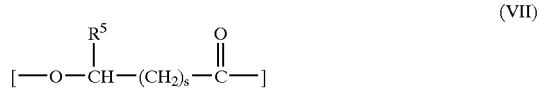

(VII)

wherein $R^5$ is H, or a C1–C19 alkyl or alkenyl group and s is 1 or 2, with the provision that the additional RRMUs are not the same as the first or second RRMUs. The compositions further comprise a second biodegradable polyhydroxyalkanoate homo- or copolymer, or blend thereof, comprising at least one randomly repeating monomer unit having the structure (IV):

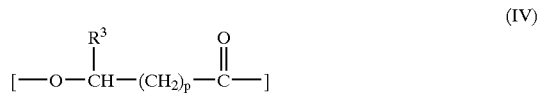

(IV)

wherein $R^3$ is H, or C1 or C2 alkyl, and p is 1 or 2. In a preferred embodiment, $R^3$ is a methyl group ($CH_3$), whereby the RRMU for the second biodegradable polyhdroxyalkanoate has the structure:

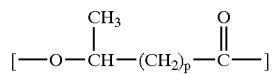

wherein p is 1 or 2. In a further preferred embodiment, $R^3$ is methyl and p is 1, whereby the second polyhydroxyalkanoate polymer comprises 3-hydroxybutyrate units. In a further preferred embodiment, the second biodegradable polymer is the polyhydroxybutyrate homopolymer. Optionally, the second biodegradable polymer comprises two or more additional randomly repeating monomer units selected from the group consisting of the structures (V) and (VI):

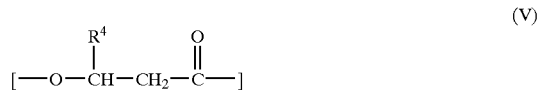

(V)

wherein $R^4$ is a C2–C19 alkyl or C2–C19 alkenyl, and

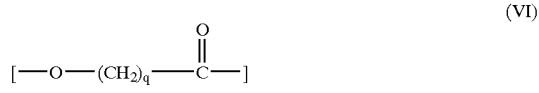

(VI)

wherein q is from 2 to about 16. With reference to the second RRMU comprising a monomer of structure (VI), in a preferred embodiment, q is from 2 to about 10, and more preferably is from about 4 to about 8. In a further preferred embodiment, q is about 5. When present, the additional randomly repeating monomer units represent no more than 25% of the total monomer units, preferably less than 15%, wherein the second polyhydroxyalkanoate homo- or copolymer suitably has a number average molecular weight of greater than about 50,000 g/mole, and further wherein the second biodegradable polyhydroxyalkanoate has a melting point Tm2. The second biodegradable polyhydroxyalkanoate has a melting point, Tm2, which is at least about 20° C. greater than the melting point, Tm1, of the first biodegradable polyhydroxyalkanoate, so that the equation $Tm2 \geq Tm1+20°$ C. is satisfied. The value of the melting point is generally determined by DSC (Differential Scanning Calorimetry) and is taken as the highest endothermic peak temperature observed on the DSC heating scan using, for example, the method outlined in ASTM D 3418. Although not intending to be bound by theory, it is believed that the second biodegradable polyhydroxyalkanoate can act as a nucleating agent for the first biodegradable polyhydroxyalkanoate and thereby improve the crystallization rate of the first biodegradable polyhydroxyalkanoate if the adequate blend composition, structure and high level of dispersion is achieved. In a more specific embodiment, the second PHA melting point, Tm2, is at least about 25° C. greater than the melting point, Tm1, of the first PHA. In yet further embodiments, the second PHA melting point, Tm2, is at least about 30° C. greater than the first PHA melting point, Tm1, or the second PHA melting point, Tm2, is at least about 30° C. greater, but not more than about 60° C. greater, than the first PHA melting point, Tm1.

In accordance with an important aspect of the invention, the novel compositions according to the invention are formed by solution blending or melt blending of the first and second biodegradable polyhydroxyalkanoates. It has been discovered that either solution blending or melt blending of the first and second biodegradable polyhydroxyalkanoates provides sufficient dispersion of the second biodegradable polyhydroxyalkanoate within the first biodegradable polyhydroxyalkanoate for the second biodegradable polyhydroxyalkanoate to significantly improve the crystallization rate of the first biodegradable polyhydroxyalkanoate. As will be discussed in detail below in the examples, an improvement in crystallization rate is evidenced by a reduction in the time required for the appearance of a crystallization exotherm on a Differential Scanning Calorimetry (DSC) scan, upon cooling down the composition from a given melt temperature.

A majority of the composition preferably comprises the first biodegradable polyhydroxyalkanoate, whereby the second biodegradable polyhydroxyalkanoate is finely dispersed throughout a continuous phase or matrix of the first component and is included in an amount sufficient to improve the crystallization rate of the first component. In one embodiment, compositions comprise from about 0.01 to about 10 weight percent of the second PHA component (b). In more specific embodiments, the compositions comprise from about 0.1 to about 5 weight percent of the second PHA component (b). In even more specific embodiments, the compositions comprise from about 0.1 to about 3 weight percent of the second PHA component (b).

The biodegradable polyhydroxyalkanoate components included in the compositions of the invention can be synthesized by synthetic chemical or biological based methods as disclosed, for example, by Noda in U.S. Pat. No. Re. 36,548, which is incorporated herein by reference.

As set forth above, the compositions according to the present invention which comprise the first and second PHA components are prepared by solution blending or melt blending. In solution blending processes, both components are at least partially dissolved in a common solvent, for example chloroform or acetone, although other solvents will be apparent to those skilled in the art. It will be appreciated that the second PHA component may only partially solubilize in the common solvent, or may fully solubilize in the common solvent, and both of these described embodiments are within the scope of the present solution blending methods. It will also be appreciated that the second, higher-crystallinity and higher melting component may be selected to be in the amorphous state prior to be solubilized in order to improve its solubility. This is easily achieved by quenching the polymer from the melt. Other methods include the ultrasonic emulsification of the polymer for the preparation of artificial granules which retain their amorphous state, as described by Horowitz et al (Polymer, 35, p. 5079 (1994)). In the case of only partial solubilization of the component (b), it is preferable to filter out the non-soluble fraction. The resulting blend compositions are allowed to crystallize together by any technique known in the art, including, but not limited to, cooling of the solution, precipitation of the blended polymer components in a non-solvent, or evaporation of the common solvent. Additionally, two or more of these crystallization techniques may be combined if desired.

The solution blending methods according to the invention may also be achieved as an integral part of any solvent-based process for production of the components, including, but not limited to, biomass separation processes, polymer extraction and the like used for the recovery of the first PHA component. As an example, an acetone-solubilized first PHA component comprising a branched copolymer is combined with a partially acetone-solubilized, yet-to-crystallize amorphous second PHA component in hot, or preferably cold, acetone. In further embodiments, bacterially-produced or transgenic-plant-produced PHA copolymers representing the first PHA component may be combined in solution with the second PHA component in its quenched form from a melt, in the form of crystallizable particles coated with a surfactant or phospholipid in order to maintain its amorphous state, or the like.

Alternatively, the compositions according to the present invention may be prepared by melt blending the first and second PHA components. The temperature of the melt should be greater than the melting point of the second, higher melting PHA component, and sufficient shear mixing should be applied to ensure adequate dispersion of the second PHA component within the matrix of the first PHA component. Sufficient shear mixing can be obtained by many techniques known in the art, including but not limited to, continuous mixing in a single- or twin-screw extruder or batch mixing in a Banbury mixer. After melting and mixing, the blended compositions are allowed to crystallize by any technique known in the art, including but not limited to, quenching of the melt below its' melt temperature in a water bath or by air cooling. In addition, the crystallization step can be carried out in the presence or absence of shear or extensional flows, or in any combination of flow fields thereof. In a preferred embodiment, the second, higher-melting PHA component may be plasticized or mixed with a miscible component, or both, to achieve adequate dispersion at blending temperatures below the melting point of the neat higher-melting PHA, and therefore reduce the risk of thermal degradation and/or detrimental losses in molecular weight in the PHA components during blending. Suitable plasticizers or other miscible components will be apparent to those skilled in the art and include, but are not limited to, glycerol compounds, for example glycerol triacetate, polyalkylene oxides, for example polyethylene oxide, cellulose esters, for example cellulose acetate propionate and cellulose acetate butyrate, chitan, chitosan and the like.

While not being bound by theory, it is believed that blending the higher melting PHA component with a plasticizer or a miscible component, or both, can reduce the melting temperature or increase the percentage of the crystalline phase melted at temperatures below the peak melt temperature of the neat PHA (Tm2), or both. In either case at melt blending temperatures below Tm2, more of the modified higher melting component can be adequately dispersed within the matrix of the first or lower melting PHA component as compared to the same amount of the neat higher melting PHA. Additionally, while not being bound by example, Scandola, et al. (Macromolecules 1992, 25, 6441) and Buchanan, et al. (Macromolecules 1992, 25, 7373) show that the crystallinity of PHB and PHBV are completely depressed when blended with more than about 50 weight percent cellulose acetate propionate or cellulose acetate butyrate. That is, both PHB and PHBV are completely amorphous in this state, and therefore much more amenable to adequate dispersion within the matrix of a lower melting PHA at blending temperatures below the melting temperatures of neat PHB or neat PHBV. As a result of the solution blending or melt blending of the first and second PHA components as described herein, a blend composition having a unusual broader melting endotherm that extends towards higher temperatures results. While not being bound by theory, the broader melting endotherm is suggestive of a broader distribution of crystalline species that not only encompasses the original melting range of the predominant lower melting first PHA but extends well above it, over the temperature range delineated by the higher melting second PHA component when examined by DSC. For example, solution blending of the first and second PHA components, followed by precipitation in a non-solvent, produces a composition exhibiting a single, broad expanded melting endotherm, the high-temperature end of which is representative of an array of intermediate melting crystalline entities having melting characteristics ranging between those of the first and second PHA components. In another embodiment, wherein solution blending of the first and second PHA components is followed by a precipitation by solvent evaporation, the extended melting range may give rise to the observation of additional maxima in the melting endotherm for the blend over the temperature range defined by the melting point of the original components. On the other hand, intermediate melting crystalline species are typically not obtained when the components are combined by dry blending, which is a consequence of the much coarser dispersion, and the loss in nucleation efficiency.

The broad extension of the melting endotherm which is achieved in the blend compositions of the invention provides a wide temperature window for melt processing of such blends owing to the presence of an array of residual intermediate melting species that can initiate crystallization during subsequent converting and cooling. While not being bound by theory, the high level of dispersion of the higher melting second PHA component in the crystalline phase of the lower melting first PHA component is believed to result in the significant improvements in crystallization rates obtained by the present invention.

In one embodiment, the weight ratio of the first PHA copolymer blended to the second PHA polymer comprises from about 99.9:1 to about 9:1, more preferably the weight ratio is from 99:1 to about 19:1 weight percent, and even more preferred is the range of 99:1 to about 32:1.

The compositions preferably comprise greater than about 50 weight percent of the first polyhydroxyalkanoate copolymer. In one embodiment, the composition may comprise the first and second polyhydroxyalkanoate polymers as the only polymeric components, while in yet other embodiments, one or more additional polymers or copolymers may be included in combination with the first and second polyhydroxyalkanoate polymers. For example, the compositions may include additional biodegradable polyhydroxyalkanoate polymers or copolymers, and/or additional polymeric components, for example additional polyester components or the like. In such embodiments, the biodegradable first and second polyhydroxyalkanoate components preferably comprise at least about 50 weight percent, more preferably at least about 60 weight percent, and even more preferably at least about 75 weight percent, of the polymeric components of the compositions.

The compositions may further include various nonpolymeric components including, among others, antiblock agents, antistatic agents, slip agents, pro-heat stabilizers, antioxidants, pro- or antioxidant additives, pigments, fillers and the like. Additionally, one or more plasticizers may be employed in the compositions in conventional amounts. A method for adding a plasticizer may for instance comprise mixing the higher-melting PHA component (b) with the plasticizer, for the purpose of depressing its melting point or for increasing the percentage of the crystalline phase melted at the blending temperature, or both, prior to melt-blending it with an unplasticized PHA component (a). The plasticizer then becomes a plasticizer for the final blend composition.

The compositions of the invention are suitable for forming shaped articles and owing to the improved crystallization rates of the compositions, are particularly advantageous for use in commercial processing applications. One skilled in the art will appreciate that the compositions of the invention are suitable for use in preparing shaped articles, such as fibers, nonwovens, films, coatings or moldings, and for use in shaping processes including fiber spinning, film casting, film blowing, blow molding and injection molding. These processing techniques are well known in the art and further detail herein is not required in order to enable one skilled in the art to use the compositions of the present invention in such methods. One skilled in the art will appreciate that the shaping processes will be advantageously conducted at a temperature greater than Tm1 and at a temperature less than Tm2 in order to obtain the benefit of the improved crystallization rate of the compositions of the invention. In a preferred embodiment, the shaped processing is conducted at a temperature of from about 10 to about 30° C. greater than Tm1. Moreover, it will be appreciated that the selection of an optimal crystallization temperature Tc in the downstream process where shaped articles are formed will result in shorter solidification times and polymer forms which exhibit reduced sensitivity to aging, i.e., stiffening and/or embrittlement. Preferably, the crystallization temperature Tc is in the range of about 20–90° C., more preferably in the range of about 30–80° C. whereby the resulting semicrystalline structure and morphology exhibit surprisingly good resistance to physical aging and/or secondary crystallization. While not being bound by theory, the compositions and articles of the invention are also believed to exhibit a finer spherulitic morphology as well as thicker lamellar crystals resulting from the combination of the increased nucleation density and optimal, more thermodynamically favorable lamellar crystal growth conditions and this resultant morphology is believed to provide improved mechanical properties to the compositions, with particular emphasis on ductility and toughness. Additionally, unlike many previous compositions containing conventional nucleants, shape articles formed from the compositions according to the invention exhibit good clarity substantially comparable to that of the first PHA component alone.

All publications mentioned hereinabove are hereby incorporated in their entirety by reference.

The compositions and methods of the present invention are further exemplified in the following examples. In the examples and throughout the present specification, parts and percentages are by weight unless otherwise specified.

Differential Scanning Calorimetry (DSC) measurements are performed according to ASTM D 3418, where DSC samples are prepared by first compression molding a PHA composition into a thin film of around 0.003 inches at about 140° C. between teflon sheets. The film is annealed overnight in a vacuum oven, with vacuum drawn, at a temperature of about 65° C. Samples are punched out of the resulting films using a 6 millimeter diameter skin biopsy punch. The samples are massed to approximately 5–10 milligrams, loaded into small aluminum pans with lids (Perkin Elmer #0219–0041), and crimped using a Perkin Elmer Standard Sample Pan Crimper Press (#0219–0048). Thermal tests and subsequent analyses are performed using a Perkin Elmer DSC 7 equipped with Perkin Elmer Thermal Analyses Software version 4.00.

The melt temperature of a PHA composition is determined by first heating the DSC sample from about 25° C. to 180° C. at a rate of 20° C. per minute and holding the sample at 180° C. for 3 minutes. The sample is then quenched to minus 60° C. at a rate of 300° C. per minute, held for 3 minutes at minus 60° C., then heated at a rate of 20° C. per minute to 180° C. The melt temperature is taken as the highest peak temperature in the second heat. If no melting peak is present in the second heat but there is one in the first heat (which can happen for PHA compositions that crystallize very slow), the sample pan is removed from the DSC, allowed to remain at around 25° C. for 24 hours, reheated in the DSC from about 25° C. to 180° C. at a rate of 20° C. per minute, and then the melt temperature is taken as the highest peak temperature in this third heat.

The rate of crystallization of a PHA composition at a given crystallization temperature is determined by first heating the DSC sample to the desired set temperature (which is above the melt temperature of the lower melting PHA), holding the sample at the set temperature for 2 minutes, and then subjecting the sample to a rapid cooling down to the desired crystallization temperature (about 300° C. per minute). As the temperature is held steady at the crystallization temperature, the crystallization process is evidenced by the appearance of a crystallization exotherm in the DSC isothermal scan as a function of time. A single-point characterization of the crystallization rate consists of reporting the time at which the minimum in the exotherm occurs. The latter is often considered by those skilled in the art as a reasonable indication of the half-time crystallization (t½) for the material.

EXAMPLE 1

The present example demonstrates solution blended compositions and methods of the invention. The compositions comprise first and second PHA components. The first PHA component is a copolymer of 3-hydroxybutyrate (RRMU of formula (I) wherein $R^2$ is $OH_3$ and n=1) and about 6.1 mole percent 3-hydroxyhexanoate (RRMU of formula (II) wherein $R^2$ is C3), abbreviated as PHBHx copolymer. The second PHA component is isotactic polyhydroxybutyrate (i-PH B). Compositions 1A–1E are prepared as follows: (1A) solution-blending of the PHBHx copolymer and about 2.0 weight percent i-PHB in hot chloroform (50° C.), followed by solvent evaporation; (1B) solution-blending of the PHBHx copolymer and about 2.0 weight percent i-PHB in hot chloroform, followed by precipitation of the polymer out of the solution with chilled methanol; (1C) dry-blending of the PHBHx copolymer and about 2.0 weight percent i-PHB by mixing/grinding the powders in the presence of dry ice; (1D) masterbatch of solution-blended PHBHx copolymer containing about 15% weight percent i-PHB (prepared in hot chloroform), which is then dry-blended with virgin PHBHx; and (1E) solution-blending of the PHBHx copolymer with 1 weight percent boron nitride, a conventional nucleating agent. For comparative purposes, a sample of the virgin PHBHx copolymer (composition 1F) is also prepared. Compositions 1A, 1B, 1C, and 1D are according to the invention while compositions 1E and 1F are for comparison purposes. Using the Differential Scanning Calorimetry (DSC) technique described above to assess the rate of crystallization, the data set forth in Table I illustrate the rate of crystallization of compositions 1A–1F for a given optimal crystallization temperature (56.3° C.), over a range of selected set temperatures prior to cooling. The half-time is the calorimetrically measured time it takes to reach about ½ full crystallinity, and the set temperature is the temperature at which the copolymer composition is equilibrated prior to being quenched to the crystallization temperature.

TABLE 1

Crystallization half-time values for various PHA copolymer compositions

| Set Temp. (° C.) | 130 | 140 | 150 | 160 | 170 |
|---|---|---|---|---|---|
| Poly (3HB-co-3HX(6.1%)) + 2% i-PHB/via solution-blending + evaporation --- 1A | 6 | 6 | 7 | 47 | 133 |
| Poly (3HB-co-3HX(6.1%)) + 2% i-PHB/via solution-blending + precipitation --- 1B | 7 | 8 | 8 | 69 | 171 |
| Poly (3HB-co-3HX(6.1%)) + 2% i-PHB/via grinding + dry-blending --- 1C | 18 | 31.5 | 71 | 120 | 129 |
| Poly (3HB-co-3HX(6.1%)) + 2% i-PHB/sol. masterbatch + dry-blending --- 1D | 19 | 32 | 69 | 138 | 196 |
| Poly (3HB-co-3HX(6.1%)) + 1% boron nitride --- 1E | 18 | 30 | 65 | 116 | 131 |
| Neat Poly (3HB-co-3HX(6.1%)) --- 1F | 24 | 36 | 84 | 168 | 220 |

As evidenced by Table I, there is a rapid, consistent increase in t½ in comparative compositions 1C–1F when the set temperature is raised from the original melting temperature of the PHBHx copolymer (Tm~127° C.), even in the dry blended composition 1C and the conventionally nucleated composition 1E. On the other hand, compositions 1A and 1B [according to the invention] exhibit very steadily low t½ values up to greater than about 150° C., i.e. more than 20° C. above the melting point of the original PHBHx copolymer. Hence, for these two systems, there is a processing temperature window of more than 20° C. above the original melting temperature of the PHBHx copolymer (Tm1) where the half time for crystallization remains very low, i.e., below the measurable limit of the DSC method of ~5 sec. At higher melt temperatures and up to the original melting temperature of i-PHB (Tm2), compositions 1A and 1B containing solution-blended i-PHB continue to outperform the other blends, even though t½ values are seen to progressively increase.

To further illustrate the solution-blended compositions of the invention and the dry-blended compositions, first scan heating isotherms for compositions 1A and 1C are recorded from 25 to 190° C., the results of which are set forth in FIG. 1. In the case of dry-blending, composition 1C, two well distinguished and separate melting endotherms are observed and are characteristic of the two separate components of the blends. On the other hand, in the case of solution-blending, composition 1A, a broadening of the PHBHx melting endotherm, combined with the appearance of intermediate melting species in the form of an expanded tail on the high-temperature side of the PHBHx, are observed and are indicative of structural changes in the blend. The temperature range defined by the high-temperature tail of the endotherm of composition 1A defines the preferred processing window over which the high nucleation benefit is observed.

EXAMPLE 2

In this example, a micro-extruder blown-film is prepared using a composition comprising a PHBHx copolymer nucleated with 2% solution-blended i-PHB. More specifically, a micro-extruder blown film set-up is used to assess the ability of the extruded polymer to crystallize over short time scales. A 100 g batch of the composition 1A as described in Example 1 is used (PHBHx copolymer which contains 2% of solution-blended i-PHB as a nucleating agent). Hot air is blown over the space located above the film blowing die in order to reach a higher crystallization temperature Tc and cool down the film undermost favorable conditions for both crystallization rate and physical properties. A video camera is used to record the progress of the experiment. During the trial, the extruded polymer is seen to be capable of forming a tube which at times can expand into a bubble of yet limited stability. At a melt-extrusion temperature of 160° C. and above, the extruded molten polymer remains largely amorphous and sticky. However, lowering the temperature of the melt down to about 150–155° C. produces the appearance of a "frost line" a few inches above the die, indicative that crystallization is already well underway a few seconds after the polymer has come out. Stickiness is largely subdued and the tube shape of the polymer remains stable. Thus, at a laboratory scale, the micro-extruded blown film further evidences the fast nucleation rate for the solution-blended composition.

EXAMPLE 3

This example demonstrates the enhanced crystallization exhibited by compositions prepared by solution blending methods employing partial solubilization of amorphous i-PHB in acetone, a green solvent preferred for PHA extraction.

More specifically, a copolymer of 3-hydroxybutyrate (3-HB) and about 8.4 mole percent 3-hydroxyoctanoate (3-HO), abbreviated as PHBO copolymer, is first solubilized in hot acetone (at 3% concentration of polymer). A melt-quenched amorphous i-PHB film sample is then added to the solution. The solution is either ice-chilled (composition 3B) or boiling-hot (composition 3A). Although the PHB film does not disappear totally, it breaks down into small pieces and is indicative of its partial solubility. To determine the crystallization rate improvement, samples are taken out of the solution and allowed to dry and isothermal crystallization scans are performed by DSC as described in Example 1. A sample of PHBO copolymer, without i-PHB or other nucleating agent, composition 3C, is also examined. The results are set forth in Table II. The data set forth in Table II demonstrates a large improvement in the crystallization rate (a significant drop in t½ values) for the compositions 3A and 3B that include i-PHB.

TABLE II

Crystallization half-time values for various PHA copolymer compositions

| Set Temp. (° C.) | 145 | 155 | 165 | 175 |
|---|---|---|---|---|
| Poly (3HB-co-3HO(8.4%)) + i-PHB/via solution-blending in hot acetone + precip. --- 3A | 16 | 26 | 205 | too high |
| Poly (3HB-co-3HO(8.4%)) + i-PHB/via solution-blending ---3B in cold acetone + precip. | 12 | 24 | 53 | 147 |
| Poly (3HB-co-3HO(8.4%)) --- 3C | 65 | 280 | too high | too high |

EXAMPLE 4

This example demonstrates the enhanced crystallization rate of compositions prepared by melt blending. More specifically, compositions 4A–4C are prepared from compositions comprising a copolymer of 3-hydroxybutyrate and about 6.7 mole percent 3-hydroxyhexanoate (PHBHx copolymer) and 1.0 weight percent i-PHB, using three different blending methods: (4A) solution blending of the PHBHx copolymer and i-PHB in chloroform, followed by solvent evaporation, (4B) melt blending 500 mg of the two materials in a Mini Max Molder (Custom Scientific Instruments model CS-183-078, Whippany, N.J.) for 5 minutes at 160° C. (a mixing temperature that is below the melt temperature of the i-PHB), after which the sample is removed and allowed to cool, and (4C) the same procedure as (3B), but using a 180° C. mixing temperature (a mixing temperature that is above the melt temperature of the i-PHB). For further comparison, composition 4D comprising only PHBHx copolymer, without i-PHB or other nucleating agent, is prepared.

As in Example 1, Differential scanning analysis of the resulting blends is performed to determine crystallization half-times where the half-time is the calorimetrically measured time it takes to reach about one-half full crystallinity (as determined by the minimum of the exotherm), and the set temperature is the temperature to which the polymer blend is taken and held in the DSC, prior to being quenched to the crystallization temperature Tc of 65° C. (a temperature at or near the optimal crystallization temperature for this system). The results are set forth in Table III:

TABLE III

Crystallization half-time

| | | Set Temperature | |
|---|---|---|---|
| Sample | Blending Procedure | 140° C. | 180° C. |
| 4D | control (no i-PHB) | 0.6 min | 15.0 min |
| 4A | solution blending (chloroform) | <0.07 min (below DSC limits) | 2.5 min |
| 4B | melt blending at 160° C. | 0.3 min | 4.7 min |
| 4C | melt blending at 180° C. | <0.07 min (below DSC limits) | 2.6 min |

Solution blending and melt blending above the i-PHB melting point, compositions 4A and 4C, impart crystallization rates, respectively, which are faster than the lower limit attainable by DSC at a set temperature of 140° C. and which are significantly improved over the control composition 4D. Melt blending below the i-PHB melt temperature (composition 4B), as described by the method preconized by Liggat's patent, results in only a modest reduction compared to the control composition 4D, and again highlight the benefits of the present invention. In addition, at the higher set temperature of 180° C., compositions 4A and 4C similarly exhibit substantial improvement over the controls.

EXAMPLE 5

This example demonstrates the enhanced crystallization rate of compositions prepared by melt blending a PHBO copolymer with plasticized i-PHB. More specifically, a master batch of i-PHB plasticized with glycerol triacetate (GTA) is prepared by first solution blending the two components in chloroform at a weight ratio of about 60:40 i-PHB:GTA, and then allowing the blend to dry by evaporation. A copolymer of 3-hydroxybutyrate and about 7.8 mole percent 3-hydroxyoctanoate (PHBO copolymer) is melt blended with about 1.7 weight percent of the i-PHB/GTA masterbatch (yielding about 1.0 wt % i-PHB overall) in a Mini Max Molder (Custom Scientific Instruments model CS-183-078, Whippany, N.J.), where a total of 500 mg of PHBO and i-PHB/GTA are added to the mixing chamber. The temperature is held constant at 160° C., which in the case of the i-PHB/GTA masterbatch is above its melting point, and allows complete dispersion of the masterbatch in the PHBO copolymer. Indeed, in another series of experiment, we have shown that it is possible to depress the melting point of i-PHB by 35° C., when blended with 50% of glycerol triacetate, or by 55° C., in the case of a blend containing 90% of the plasticizer. After a 5 minute mixing period, the sample, composition 5A, is removed and allowed to cool. Two additional compositions 5B and 5C are also prepared: (5B) melt blending the PHBO with 1.0 wt % neat i-PHB for 5 minutes at 160° C.—in this case, the i-PHB is not melted and the method is reminiscent of that disclosed by Liggat; And (5C) melt mixing the PHBO for 5 minutes at 160° C. (no second PHA or other nucleator added)—as a control material in our experiment.

Analysis by Differential Scanning Calorimetry of the resulting blends is performed to determine crystallization half-times as described in Example 4. The results are set forth in Table IV:

TABLE IV

Crystallization half-times

| | | Set Temperature | |
|---|---|---|---|
| Sample | Nucleation System | 140° C. | 180° C. |
| 5C | none | 1.7 min | 12.0 min |
| 5A | 60:40 iPHB:GTA (1.0 w i-PHB) | <0.07 min (below DSC limits) | 4.8 min |
| 5B | neat i-PHB (1.0 wt %) | 0.3 min | 7.1 min |

At both set temperatures, but preferably at the lower set temperature value, there are distinct improvements in the rate of crystallization using the plasticized i-PHB (composition 5A) as compared with the neat i-PHB (composition 5B). The latter method (Liggat's composition and method) only yields a modest improvement over the virgin copolymer.

EXAMPLE 6

This example demonstrates the enhanced crystallization rate of compositions prepared by melt blending a PHBO copolymer with a miscible blend of i-PHB and PEO. More specifically, a master batch of i-PHB and poly(ethylene oxide) (PEO, average molecular weight of about 200) is prepared by first solution blending the two components in chloroform at a weight ratio of about 60:40 i-PHB:PEO, and then allowing the blend to dry by evaporation. The PHBO copolymer from Example 5 is melt blended with about 1.7 weight percent of the i-PHB/PEO masterbatch (yielding about 1.0 wt % i-PHB overall) as described in Example 5 to provide composition 6A. Two additional compositions 6B and 6C are also prepared: (6B) melt blending the PHBO with about 1.0 wt % neat i-PUB for 5 minutes at 160° C., and (6C) melt mixing the PHBO for 5 minutes at 160° C. (no i-PHB or other nucleator added).

Differential scanning analysis of the resulting blends is performed as described in Example 4 to determine crystallization half-times. The results are set forth in Table V:

TABLE V

Crystallization half-times

| Sample | Nucleation System | Set Temperature 140° C. | 180° C. |
|---|---|---|---|
| 6C | none | 1.7 min | 12.0 min |
| 6A | 60:40 iPHB:PEO (1.0 wt % i-PHB) | <0.07 min (below DSC limits) | 5.3 min |
| 6B | neat i-PHB (1.0 wt %) | 0.3 min | 7.1 min |

At both set temperatures, there are distinct improvements in the rate of crystallization using the miscible blend of i-PHB and PEO (composition 6A) as compared with the neat i-PHB (composition 6B), and using the i-PHB-containing compositions (6A and 6B) as compared with the PHBO composition alone (6C).

EXAMPLE 7

This example demonstrates the improvement in physical properties that is accompanied when higher crystallization temperatures are selected while forming articles using the PHA compositions of the present invention. The focus here is on thoughness measurements which provide an indication of the robustness of the films being tested. The so-called "biaxial tear test" is used to evaluate both stiffness and toughness properties of experimental films. The test consists of tensile loading a 3-inch wide by 0.5 inch long strip of film along its longer edges, using an Instron® universal testing machine, after a 1 inch-long pre-cut is placed in the center of the specimen using a sharp razor blade. For those acquainted to the phenomenon of fracture, the mode of loading applied at the tip of the pre-existing cut is the cleavage mode, or tensile-opening mode, known as Mode I. The load experienced by the film upon drawing is recorded by the load cell to construct the load-displacement curve characteristic of the material. From the above experimental curve, it is possible to derive measures of both stiffness and toughness of the films, for the selected test conditions.

The initial linear rise in load provides a measure of the elastic property of the specimen ligaments prior to any failure initiation or growth. The maximum slope determined on the stress-strain curve provides a quantitative value of the elastic modulus:

$$E = \partial \sigma / \partial \varepsilon$$

The mechanical energy absorbed or dissipated in the specimen normalized by its section defines the material's toughness and is experimentally provided by integrating the area under the curve. Three partial energy values are recorded: at the maximum load ($\sigma_{max.}$) of the recorded load-displacement curve, the load at $\frac{2}{3}\sigma_{max.}$, which describes the point where ⅓ of the mechanical integrity of the ligament is lost, and finally ⅓ $\sigma_{max.}$, at which point the ligament has lost ⅔ of its mechanical integrity. For sake of simplicity and practicality in our benchmarking effort, the normalized partial energy up to a loss of ⅓ mechanical integrity was chosen as a single-point characterization of the material toughness.

$$T_{2/3} = \int_0^{2/3\sigma_{max}} \sigma \cdot d\varepsilon$$

First, two random copolymers with 3-hydroxyhexanoic acid (3HX) at different comonomer level (i.e. $C_3H_7$ branching) were examined. Films of a synthetic poly(3HB-co-3HX(6.8%)) copolymer of high MW (~685K) were melt-pressed at 165° C. using a Carver Press and a three-step procedure necessary to ensure the good quality of the melt-pressed films. These were tested after being crystallized at two different temperatures (23° C. and 95° C.). Specimens crystallized at R.T. were found to exhibit low toughness and were virtually brittle, whereas those crystallized at 95° C. exhibited pseudo-ductile behavior and were 2 to 3 times tougher, at comparable stiffness.

Similarly, films made of poly(3HB-co-3HX(10.8%)) which had been pressed at 155° C. and crystallized at either R.T., or 78° C. appeared to be slightly less stiff (~330 MPa) and more than 40% tougher.

Another important consideration regarding PHA copolymers is whether the detrimental effect of physical aging on their mechanical properties can be minimized by high temperature crystallization, which in turn is promoted by faster crystallization in a continuous process. For that purpose, a series of film specimens made of poly(3HB-co-8.4%3HO)) were tested either a couple of days after been pressed, or allowed to age at RT for ~120 days prior to being tested. Pressing temperature was varied from R.T to 50° C. and 80° C. The resultant data entered in table VI reveals a general slight stiffening of the specimens (modulus ~370 MPa) along with a significant loss in toughness (~20 kJ/m²), raising potential concerns for the long-term physical integrity of these materials. Moreover, films crystallized at R.T. seem to undergo the largest extent of stiffening (>400 MPa) along with a greater loss in toughness that actually led to their embrittlement, as a result of aging. The data clearly support our finding that reducing the extent of physical aging in PHA's may be achieved by means of crystallizing the polymer at high temperatures, which in turn can be promoted by the addition of a nucleating agent that promotes faster crystallization in an actual process.

TABLE VI

Mechanical Properties of PHA Copolymer Films

| PHA Copolymer Type | Film Preparation Conditions | Stiffness (MPa) | Toughness (kJ/m^2) |
|---|---|---|---|
| Poly(3HB-co-3HX(6.8%)) | Crystallized @ 23C | 485 | 8.5 |
| Poly(3HB-co-3HX(6.8%)) | Crystallized @ 95C | 495 | 21 |
| Poly(3HB-co-3HX(10.8%)) | Crystallized @ 23C | 310 | 42.5 |
| Poly(3HB-co-3HX(10.8%)) | Crystallized @ 78C | 350 | 59 |
| Poly(3HB-co-3HO(8.4%)) | Crystallized @ 23C | 380 | 34 |
| Poly(3HB-co-3HO(8.4%)) | Crystallized @ 50C | 365 | 33 |
| Poly(3HB-co-3HO(8.4%)) | Crystallized @ 80C | 330 | 46 |
| Poly(3HB-co-3HO(8.4%)) | Crystallized @ 23C, aged | 420 | 8 |
| Poly(3HB-co-3HO(8.4%)) | Crystallized @ 50C, aged | 350 | 18.5 |

TABLE VI-continued

Mechanical Properties of PHA Copolymer Films

| PHA Copolymer Type | Film Preparation Conditions | Stiffness (MPa) | Toughness (kJ/m^2) |
|---|---|---|---|
| Poly(3HB-co-3HO(8.4%)) | Crystallized @ 80C, aged | 370 | 28 |

The specific embodiments and examples set forth above are provided for illustrative purposes only and are not intended to limit the scope of the following claims Additional embodiments of the invention and advantages provided thereby will be apparent to one of ordinary skill in the art and are within the scope of the claims.

What is claimed is:

1. A composition, comprising (a) a continuous phase of a first biodegradable polyhydroxyalkanoate comprising a copolymer of at least two randomly repeating monomer units, wherein the first randomly repeating monomer unit has the structure (I):

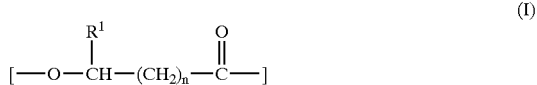

(I)

wherein $R^1$ is H, or C1 or C2 alkyl, and n is 1 or 2; and the second randomly repeating monomer unit is different from the first randomly repeating monomer unit and comprises at least one monomer selected from the group consisting of the structures (II) and (III):

(II)

wherein $R^2$ is a C3–C19 alkyl or C3–C19 alkenyl, and

(III)

wherein m is from 2 to about 16, and wherein at least about 50 mole % of the copolymer comprises randomly repeating monomer units having the structure of the first randomly repeating monomer unit (I), wherein the first biodegradable polyhydroxyalkanoate has a melting point Tm1: and (b) a second crystallizable biodegradable polyhydroxyalkanoate comprising a randomly repeating monomer unit having the structure (IV):

(IV)

wherein $R^3$ is H, or C1 or C2 alkyl, and p is 1 or 2, wherein the second biodegradable polyhydroxyalkanoate has a melting point Tm2, wherein Tm2 is at least about 20° C. greater than Tm1, and wherein the second biodegradable polyhydroxyalkanoate polymer (b) is finely dispersed within the bulk of the first biodegradable polyhydroxyalkanoate (a), to form a composition with enhanced crystallization and physical properties.

2. A composition according to claim 1, wherein the composition is formed by solution blending of the components (a) and (b).

3. A composition according to claim 1, wherein the composition is formed by melt blending of the components (a) and (b).

4. A composition according to claim 1, wherein the composition comprises from about 0.01 to about 10 weight percent of component (b).

5. A composition according to claim 4, wherein the composition comprises from about 0.1 to about 5 weight percent of component (b).

6. A composition according to claim 5, wherein the composition comprises from about 0.1 to about 3 weight percent of component (b).

7. A composition according to claim 1, wherein Tm2 is at least about 25° C. greater than Tm1.

8. A composition according to claim 7, wherein Tm2 is at least about 30° C. greater than Tm1.

9. A composition according to claim 7, wherein Tm2 is not more than about 60° C. greater than Tm1.

10. A composition according to claim 1, wherein the first randomly repeating monomer unit of component (a) has the structure:

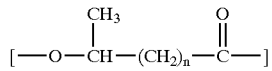

wherein n is 1 or 2, and the second randomly repeating monomer unit of component (a) has the structure:

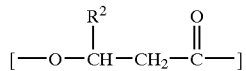

wherein $R^2$ is a C3–C19 alkyl.

11. A composition according to claim 10, wherein n is 1.

12. A composition according to claim 11, wherein $R^2$ is a C3 alkyl.

13. A composition according to claim 1, wherein the first randomly repeating monomer unit of component (a) has the structure:

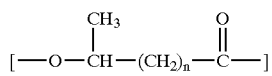

wherein n is 1 or 2, and the second randomly repeating monomer unit of component (a) has the structure:

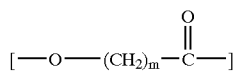

wherein m is from 2 to about 16.

14. A composition according to claim 13, wherein m is 5.

15. A composition according to claim 14, wherein n is 1.

16. A composition according to claim 1, wherein the molar ratio of the first randomly repeating monomer units to the second randomly repeating monomer units in component (a) is in the range of from about 50:50 to about 99:1.

17. A composition according to claim 16, wherein the molar ratio of the first randomly repeating monomer units to the second randomly repeating monomer units in component (a) is in the range of from about 75:25 to about 95:5.

18. A composition according to claim 1, wherein component (a) has a number average molecular weight of greater than about 100,000 g/mole and wherein component (b) has a number average molecular weight of greater than about 50,000 g/mole.

19. A composition according to claim 1, wherein component (b) comprises repeating monomer units having the structure:

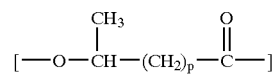

wherein p is 1 or 2.

20. A composition according to claim 1, wherein component (b) includes a plasticizer.

* * * * *